United States Patent

Close, Jr.

[11] Patent Number: 5,253,962
[45] Date of Patent: Oct. 19, 1993

[54] CHOCK HANGER

[76] Inventor: John W. Close, Jr., 980 S. 72nd St., Omaha, Nebr. 68114

[21] Appl. No.: 969,922

[22] Filed: Oct. 15, 1992

[51] Int. Cl.$^5$ .............................................. F16B 13/04
[52] U.S. Cl. .......................................... 411/34; 411/55
[58] Field of Search .............. 411/55, 45, 34, 49, 411/38, 51, 36, 37

[56] References Cited

U.S. PATENT DOCUMENTS

| | | | |
|---|---|---|---|
| 3,013,643 | 12/1961 | Perry | 411/34 X |
| 3,489,312 | 1/1970 | Hunckler et al. | 411/34 X |
| 4,108,043 | 8/1978 | Varga | 411/34 |

Primary Examiner—Rodney M. Lindsey
Attorney, Agent, or Firm—Zarley, McKee, Thomte, Voorhees & Sease

[57] ABSTRACT

A chock hanger includes a generally cylindrical hanger body having an aperture therethrough with a tubular bushing mounted in the aperture. A cylindrical connector body has a flange extending annularly and outwardly from the forward end thereof which serves as a stop when the connector body is journaled through an aperture in a thin flat wall. A washer is interposed between the forward end of the connector body and the rearward end of the hanger body, and a screw is journaled through the hanger body, washer, and connector body and thence threaded in a nut mounted in the rearward end of the connector body. The screw cap has a diameter such that the cap abuts the bushing so that threading the screw into the nut compresses the connector body along the longitudinal axis thereof. The connector body is formed of a resilient flexible material which will deform when placed in longitudinal compression, thereby forming a bulge adjacent the exterior surface of the wall.

8 Claims, 2 Drawing Sheets

CHOCK HANGER

TECHNICAL FIELD

The present invention relates generally to apparatus for supporting automobile chocks for storage within a railroad car, and more particularly to an improved chock hanger which is removably mountable in a railroad auto transport car side screen.

BACKGROUND OF THE INVENTION

Chocks are utilized in railroad auto transport cars to secure the wheels of vehicles to prevent their movement within the railroad car. While the chocks have keyhole slots formed thereon for storage of the chocks on pegs projecting from the railroad car super structure, such storage has several drawbacks. The prior art pegs for supporting chocks are affixed in the structure, and are not intended to be moved. Thus, the peg supports are located for specific chock lengths.

It is therefore a general object of the present invention to provide an improved chock hanger.

Another object is to provide a chock hanger which is easily removable and replaceable.

Still another object of the present invention is to provide a chock hanger which may be attached to a variety of railroad auto transport screen walls.

These and other objects will be apparent to those skilled in the art.

SUMMARY OF THE INVENTION

The chock hanger of the present invention includes a generally cylindrical hanger body having an aperture therethrough with a tubular bushing mounted in the aperture. A cylindrical connector body has a flange extending annularly and outwardly from the forward end thereof which serves as a stop when the connector body is journaled through an aperture in a thin flat wall. A washer is interposed between the forward end of the connector body and the rearward end of the hanger body, and a screw is journaled through the hanger body, washer, and connector body and thence threaded in a nut mounted in the rearward end of the connector body. The screw cap has a diameter such that the cap abuts the bushing so that threading the screw into the nut compresses the connector body along the longitudinal axis thereof. The connector body is formed of a resilient flexible material which will deform when placed in longitudinal compression, thereby forming a bulge adjacent the exterior surface of the wall. The bulge formed by threading the screw into the nut retains the connector body and hanger body on the wall The connector body is formed of a resilient material with memory, such that unthreading the screw from the nut will return the connector body to its original shape to allow removal of the hanger and connector body from the wall.

DESCRIPTION OF THE PREFERRED EMBODIMENT

Figure 1:
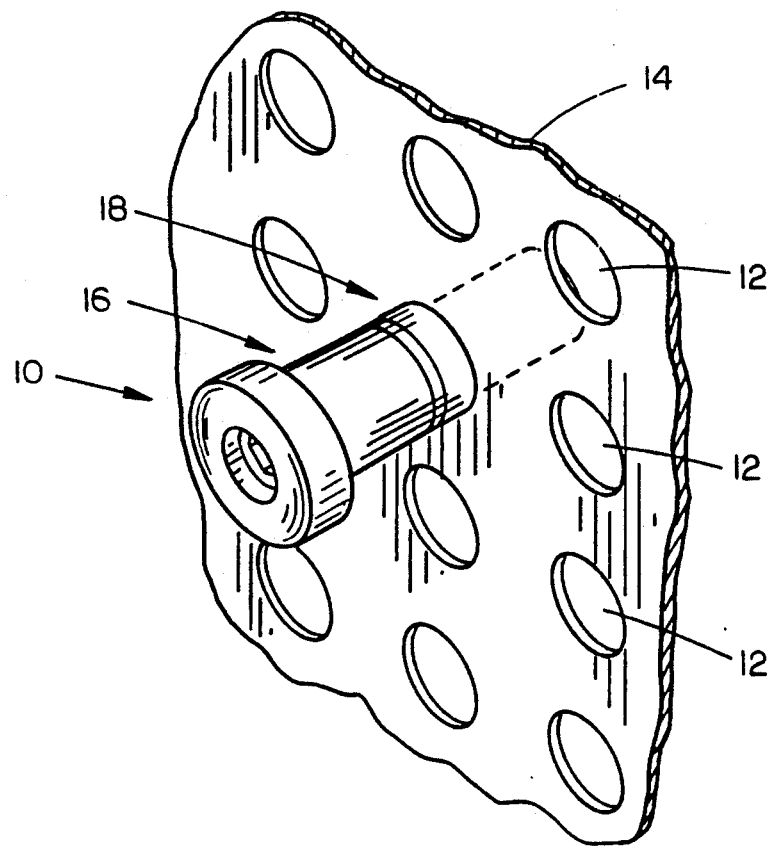
FIG. 1 is a perspective view of a chock hanger of the present invention installed on the screen wall of a railroad auto transport car.

Referring now to the drawings, in which similar or corresponding parts are identified with the same reference numeral, and more particularly to FIG. 1, the chock hanger of the present invention is designated generally at 10 and is shown inserted in one of a plurality of apertures 12 in a conventional railroad auto transport car screen wall 14. Chock hanger 10 includes a forward hanger body 16 for supporting the chock, and a rearward connector body 18 for connecting the hanger body 16 to the screen wall 14.

Figure 2:
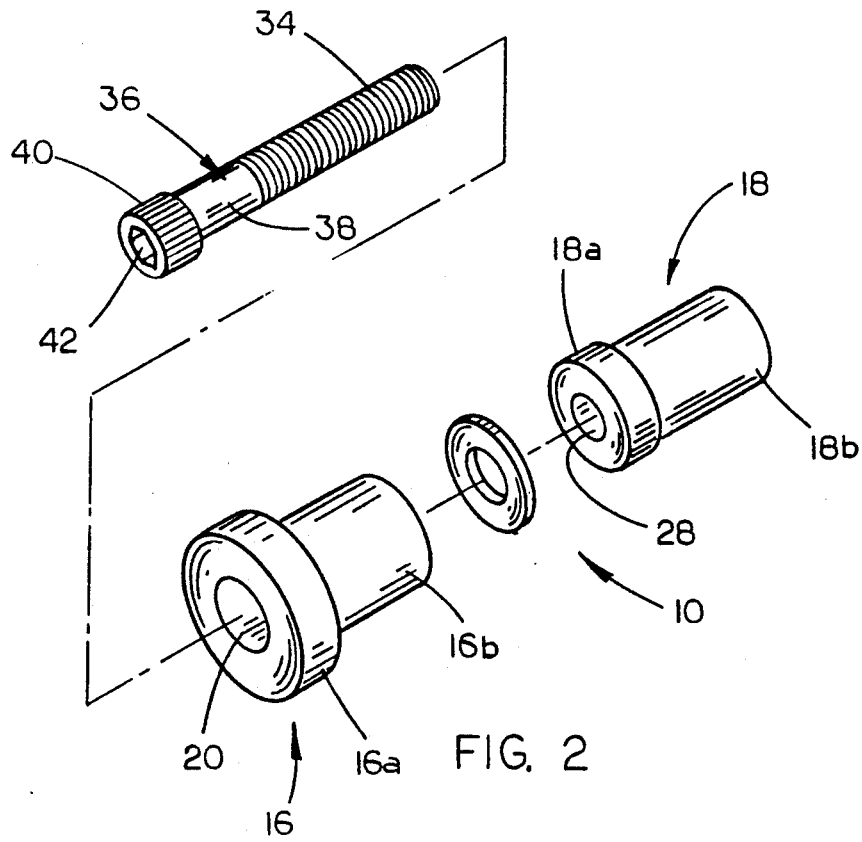
FIG. 2 is an exploded perspective view of the chock hanger of the present invention.
Figure 3:
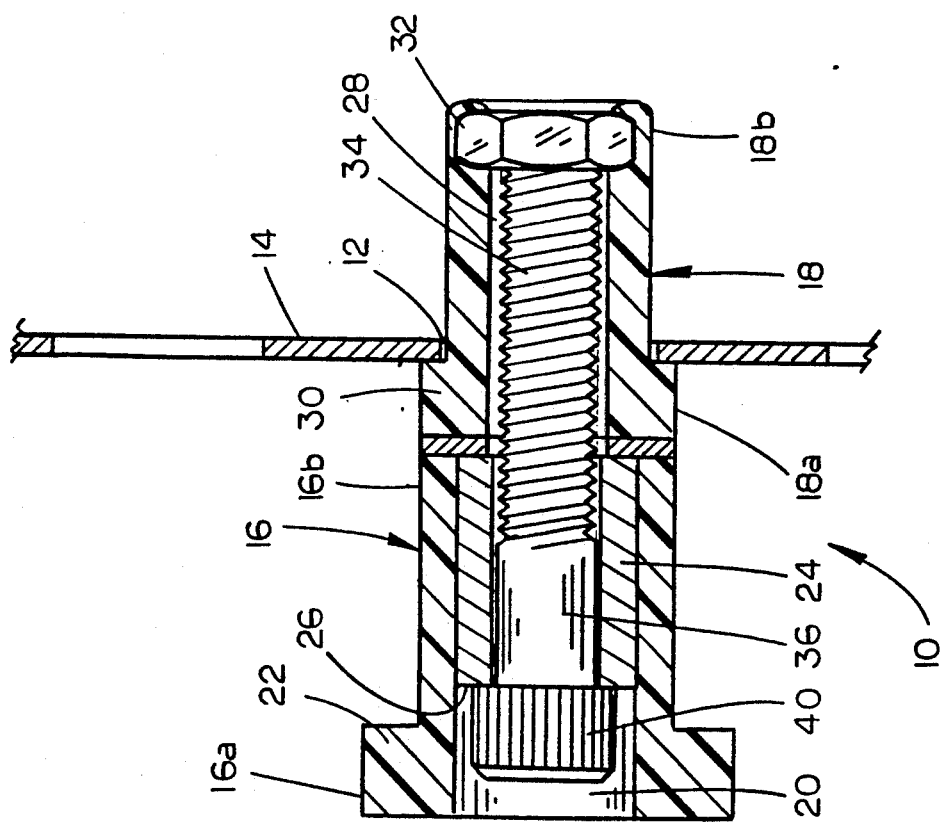
FIG. 3 is a vertical sectional view of the invention inserted through an aperture in a screen wall, prior to tightening.

Referring now to FIGS. 2 and 3, hanger body 16 is generally cylindrical, with a hollow cylindrical aperture 20 extending along the longitudinal axis of the hanger body 16 from the forward end 16a to the rearward end 16b. An outwardly projecting annual flange 22 is formed on the forward end 16a of body 16, to retain the chocks on the hanger body 16. Preferably, hanger body 16 is formed of a rigid yet resilient material such as neoprene.

A hollow cylindrical bushing 24 has an outside diameter equal to the diameter of aperture 20, for a tight friction fix therein. Bushing 24 is shorter in length than hanger body 16 so as to form a shoulder 26 on the forward end of bushing 24 within aperture 20.

Connector body 18 is also preferably manufactured of a rigid resilient material such as neoprene, and is generally cylindrical in shape. A cylindrical aperture 28 extends through connector body 18 along the longitudinal axis thereof from the forward end 18a to the rearward end 18b. Aperture 28 in connector body 18 has a diameter which is less than the diameter of aperture 20 of hanger body 16. Connector body 18 also has an outwardly projecting annual flange 30 with an outer diameter approximately equal to the outer diameter of the rearward end 16b of hanger body 16. Flange 30 has an outer diameter greater than the diameter of the conventional screen wall aperture 12, so that the rearward end 18b of connector body 18 will extend through aperture 12 until flange 30 contacts the screen wall 14.

A nut 32 is mounted in the rearward end 18b of connector body 18 and is designed to threadably receive the threads 34 of a screw 36.

As shown in FIG. 2, screw 36 includes a shaft 38 having threads 34 and an enlarged cap 40 at the forward end thereof. Cap 40 has a generally hexagonal socket 42 formed in the upper end for rotating screw 36.

Figure 4:
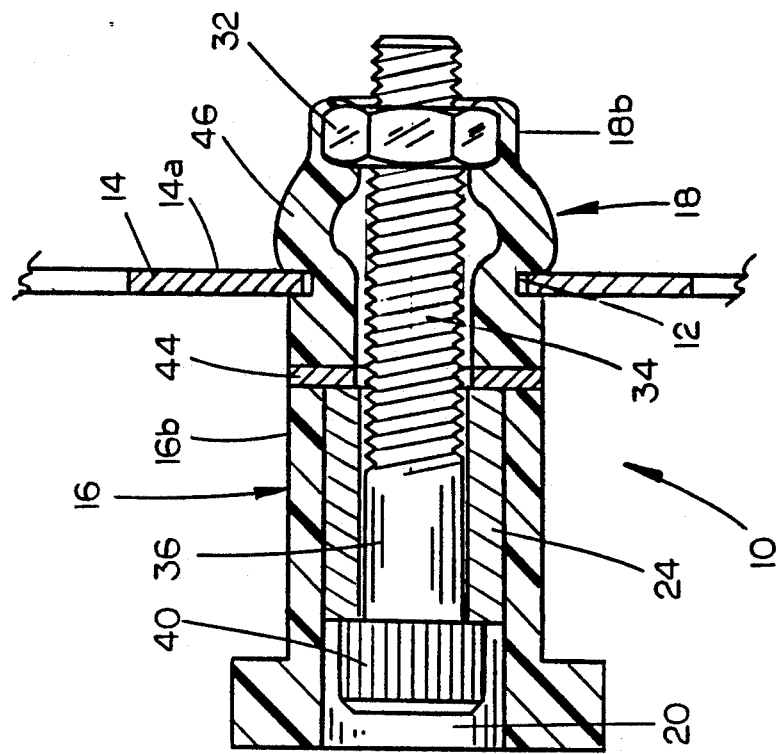
FIG. 4 is a view similar to FIG. 3, but with the hanger tightened into a fastened position.

Cap 40 of screw 36 has an outer diameter which is greater than the inner diameter of bushing 24 so as to contact shoulder 26 when screw shaft 38 is journaled through bushing 24, as shown in FIG. 3. As shown in FIG. 4, rotation of screw 36 will cause threads 34 to engage the threads in nut 32 and draw nut 32 forwardly towards cap 40 of screw 36.

A washer 44 is interposed between hanger body 16 and connector body 18 and has an outer diameter equal to the outer diameter of the rearward end 16b of hanger body 16 and an inner diameter less than the outer diameter of bushing 24. In this way, the rearward end of bushing 24 will contact washer 44 such that bushing 24 will not deform connector body 18 upon rotation of screw 36.

The cylindrical wall of connector body 18 will bulge outwardly in contact with the rearward surface 14a of screen wall 14 as screw 36 is threaded into knot 32. This bulge 46 has a diameter greater than that of the aperture 12 in screen wall 14, and thereby fastens connector body 18 in position in screen wall 14. Because connector body 18 is formed of a resilient material such as neoprene, reversing the rotation of screw 36 will cause connector body 18 to straighten out as shown in FIG. 3, for ease of removal of the chock hanger 10 from screen wall 14.

Whereas the invention has been shown and described in connection with the preferred embodiment thereof, it will be understood that many modifications, substitutions and additions may be made which are within the intended broad scope of the appended claims.

I claim:

1. A chock hanger, comprising:
   an elongated hanger body having first and second ends and a cylindrical aperture extending lengthwise therethrough;
   a tubular bushing positioned coaxially within said cylindrical aperture, having first and second ends, an inner diameter, and an outer diameter;
   a rigid flat washer having an aperture therethrough and forward and rearward faces, positioned with its forward face against the second ends of said hanger body and bushing and coaxial therewith;
   said washer aperture having a diameter less than the outer diameter of the bushing such that the second end of the bushing contacts the forward face of the washer;
   an elongated connector body of a resilient flexible material with memory, having first and second ends and a cylindrical aperture extending lengthwise therethrough;
   said connector body aperture having a diameter substantially the same as the inner diameter of said washer;
   said connector body having a flange formed at the first end thereof projecting annularly outwardly therefrom;
   a nut immovably mounted in the second end of said connector body with a threaded aperture located coaxial with the connector body aperture;
   said connector body front end positioned in abutting contact with the rearward face of said washer with the connector body aperture aligned with the washer aperture; and
   a screw having a cap and threaded shank, the threaded shank journaled through said bushing, washer aperture and connector body aperture and threaded into said nut;
   said screw cap having a diameter greater than the inner diameter of the bushing such that the cap will contact the bushing first end when the shank is threaded into the nut.

2. The chock hanger of claim wherein said bushing has a length less than the length of the hanger body.

3. The chock hanger of claim 2, wherein said screw cap has an outside diameter which is less than the diameter of the hanger body aperture, such that the screw cap is journaled completely within the hanger body aperture when the shank is threaded in the nut.

4. The chock hanger of claim 1, wherein said hanger body is generally cylindrical.

5. The chock hanger of claim 4, wherein said connector body is generally cylindrical, and said connector body flange outer diameter is substantially the same diameter as the hanger body.

6. The chock hanger of claim 1, wherein said hanger body is formed from a resilient material.

7. The chock hanger of claim 1, further comprising a flange formed on the first end of said hanger body projecting annularly outwardly therefrom.

8. In combination, a thin, flat wall structure having an opening therethrough; and
   a chock hanger removably mounted through said wall structure opening;
   said chock hanger comprising:
      an elongated hanger body having first and second ends and a cylindrical aperture extending lengthwise therethrough;
      a tubular bushing positioned coaxially within said cylindrical aperture, having first and second ends, an inner diameter, and an outer diameter;
      a rigid flat washer having an aperture therethrough and forward and rearward faces, positioned with its forward face against the second ends of said hanger body and bushing and coaxial therewith;
      said washer aperture having a diameter less than the outer diameter of the bushing such that the second end of the bushing contacts the forward face of the washer;
      an elongated connector body of a resilient flexible material with memory, having first and second ends and a cylindrical aperture extending lengthwise therethrough;
      said connector body aperture having a diameter substantially the same as the inner diameter of said washer;
      said connector body having a flange formed at the first end thereof projecting annularly outwardly therefrom;
      a nut immovably mounted in the second end of said connector body with a threaded aperture located coaxial with the connector body aperture;
      said connector body front end positioned in abutting contact with the rearward face of said washer with the connector body aperture aligned with the washer aperture; and
      a screw having a cap and threaded shank, the threaded shank journaled through said bushing, washer aperture and connector body aperture and threaded into said nut;
      said screw cap having a diameter greater than the inner diameter of the bushing such that the cap will contact the bushing first end when the shank is threaded into the nut.

* * * * *